Aug. 8, 1950     J. C. COX     2,518,289
ELECTRODE HOLDER
Filed April 8, 1948
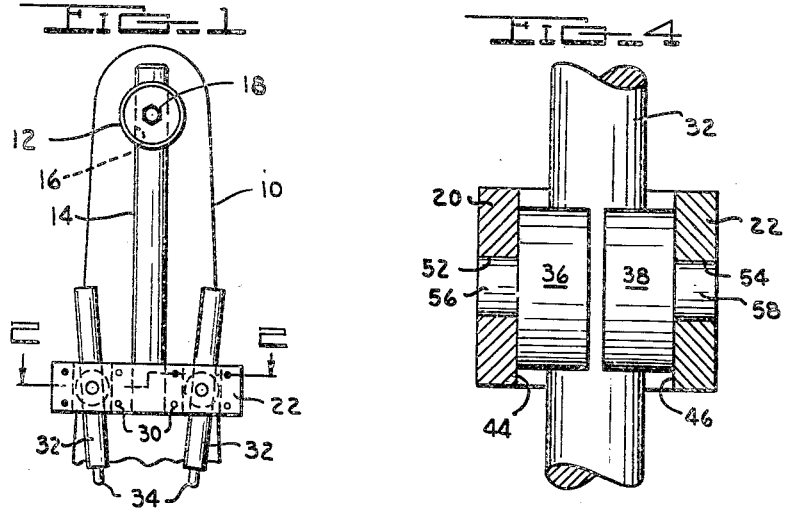
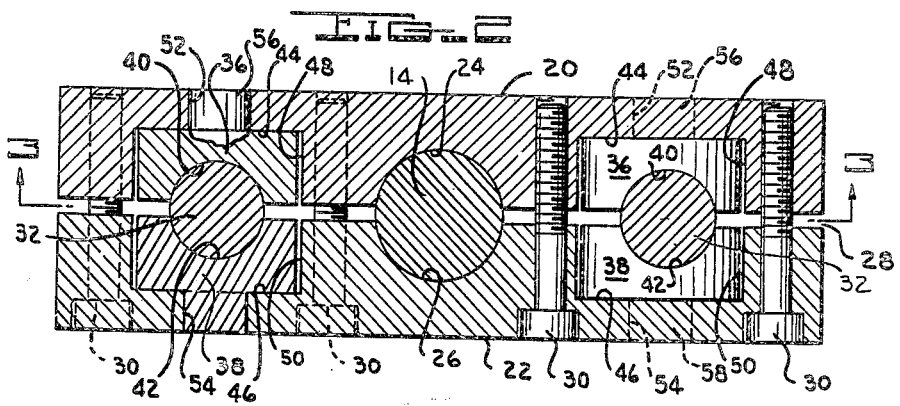
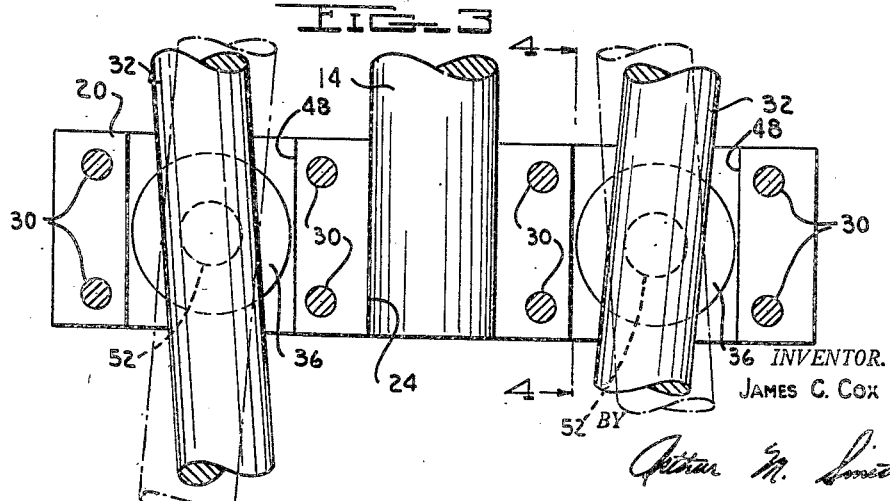
INVENTOR.
JAMES C. COX
BY
ATTORNEY Patented Aug. 8, 1950

2,518,289

UNITED STATES PATENT OFFICE 2,518,289

ELECTRODE HOLDER

James C. Cox, Detroit, Mich., assignor to S-M-S Corporation, Detroit, Mich., a corporation of Michigan Application April 8, 1948, Serial No. 19,721

3 Claims. (Cl. 248—229)

The present invention relates to an improved universally adjustable clamping means which is particularly but not exclusively adapted for clamping a welding electrode holder.

A preferred embodiment of the present invention comprises a pair of clamping brackets pivotally and slidably adjustable along a supporting shaft to which the clamping brackets are securely clamped in an adjusted position, as for example by screw-threaded means. The immediate clamps for the electrode holder or other object to be clamped are paired opposed and separable pivotal clamps, one of each being seated and adjustably mounted on one of each of the clamping brackets for coaxial pivotal movement with the other.

The paired pivotal clamps are seated within mating rectangular grooves provided by the clamping brackets. The electrode holder or object to be clamped passes through the said grooves and between the opposed pivotal clamps, which latter tightly clamp the sides of the electrode holder or other object therebetween and are simultaneously immobilized by friction contact with their respective clamping brackets as the latter are clamped toward each other. In the same action, the clamping brackets firmly clamp the aforesaid supporting shaft.

Before the clamping brackets are firmly clamped against the supporting shaft and pivotal clamps therebetween, suitable angular adjustment of the electrode holder or other object to be clamped is permitted by pivotal adjustment of the pivotal clamps therefor. Likewise longitudinal adjustment of the electrode holder or other object is permitted between the untightened pivotal clamps.

A primary object of the present invention is to provide an adjustable clamp of the character described which is adapted to grip one or more objects, such as electrode holders for example, and to permit universal adjustment of the objects being clamped.

Prior to the present invention, clamps of the class of the present invention for one or more welding electrode holders did not permit the electrode points to be brought sufficiently close together to be useful in many applications. In the typical conventional multiple holder clamp, a plurality of parallel electrode holders are adjustable linearly in directions perpendicular to their longitudinal axes, so that the minimum separation between adjacent holders is determined by the thickness of the electrode holder. Accordingly, other objects of the present invention are to provide a clamp for one or more welding electrode holders, which permits universal adjustment of the holders relative to the work so as to produce a weld at any desired point; and to provide an angular adjustment which permits the electrode tips of two or more electrode holders to be brought closely together, spaced only by the thickness of the tips rather than the thickness of the holders.

Other objects of this invention will appear in the following description and appended claims, reference being had to the accompanying drawings forming a part of this specification wherein like reference characters designate corresponding parts in the several views.

In the drawings:

Fig. 1 is a fragmentary elevation of an electrical welding apparatus employing the clamping means of the present invention.

Fig. 2 is an enlarged horizontal section taken in the direction of the arrows essentially along the broken line 2—2 of Fig. 1.

Fig. 3 is a fragmentary vertical section taken in the direction of the arrows essentially along the line 3—3 of Fig. 2.

Fig. 4 is a fragmentary vertical section taken in the direction of the arrows essentially along the line 4—4 of Fig. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular embodiment of the present invention is shown by way of example in the drawings. A frame 10 of a welding machine supports the horizontally extending journal shaft 12. A cylindrical supporting shaft 14 extends through an opening 16 of the shaft 12 and is secured in place by the bolt means 18 extending longitudinally of the shaft 12 and adapted to secure the latter in a pivotally adjusted position upon being tightened. The construction of the journal shaft 12 and the clamping bolt means 18 may be conventional and is accordingly not described in detail herein.

At the lower end of the supporting shaft 14 are clamped the pair of separable and opposed clamping brackets 20 and 22, which provide the mating cylindrical grooves 24 and 26 respectively for engaging the opposed cylindrical sides of the shaft 14. In the clamped position on the shaft 14, the adjacent faces of the brackets 20 and 22 are spaced by the opening 28 therebetween and are drawn toward each other on opposite sides of the shaft 14 by means of the plurality of screws 30, which in the present instance are countersunk in and extend through the bracket 22 and are screw-threaded into the bracket 20. Upon loosening the screws 30, the brackets 20—22 may be adjusted pivotally or longitudinally of the axis of the shaft 14.

In the present instance, two electrode holders 32 having the electrode tips 34 are held by the two pairs of opposed cylindrical clamps 36—38. The clamps 36 and 38 of each mating pair provide the mating groove 40 and 42 respectively for engaging and conforming to the opposed surfaces of the holder 32 therebetween. It will be understood that one or more sets of holders 32 and pivotal clamps 36—38 will be provided as required.

The clamps 36 and 38 are seated against the respective bases 44 and 46 of the rectangular mating recesses 48 and 50 which extend transversely through their respective clamping members 20 and 22. The clamps 36 and 38 are journaled for concentric pivotal adjusting movement within the brackets 20 and 22 respectively by means of the journal openings 52 and 54 opening from the seats 44 and 46 respectively for the stub pivot shafts 56 and 58 of the clamps 36 and 38 respectively.

By virtue of the present construction, the electrode holders 32 may be projected through the mating grooves 48—50 and clamped between the mating grooves 40—42, being adjustable longitudinally between the loosened clamps 36—38 and being angularly adjustable within the limits permitted by the mating grooves 48—50 upon pivoting the clamps 36—38 and before tightening the screws 30. Thus the electrode tips 34 may be brought to positions directly beneath the shaft 14, or may be pivoted to adjacent welding positions which are spaced only by the thickness of the tips 34, rather than by the thickness of the holders 32 which is the minimum spacing permitted by conventional electrode clamping means.

Upon tightening the screws 30, the brackets 20—22 securely clamp the shaft 14. Simultaneously each pair of clamps 36—38 securely clamp the holder 32 therebetween and are frictionally held against pivotal movement in their adjusted position by contact with their respective seats 44—46.

By the foregoing, a novel and universally adjustable electrode holding clamp has been disclosed which is readily adjustable pivotally and longitudinally relative to its supporting shaft 14 and which also permits longitudinal and pivotal adjustment of the individual electrode holders 32, facilitating their positioning for various welding operations and permitting the electrode tips 34 to be brought into contact with each other if desired or to positions directly under the supporting shaft 14, thereby avoiding blind spots where welding operations are not possible.

Having described my invention, I claim:

1. In a universally adjustable clamp for a welding electrode holder, the combination of a pair of separable opposed clamping brackets, screw means to force said brackets toward each other in a clamping action, a plurality of pivotal electrode holder clamps cooperating in opposed pairs, one of each of the pivotal clamps of each pair being frictionally seated and pivotally mounted on one of each of said clamping brackets for coaxial pivotal adjusting movement with the other clamp of said pair, each pair of clamps being forced into clamping engagement with the opposed sides of an electrode holder therebetween and being frictionally immobilized in an adjusted position by contact with its respective clamping bracket upon the forcing of said brackets toward each other in said clamping action, a cylindrical supporting shaft for said clamping brackets, said loosened clamping brackets being slidably and rotatably adjustable on said supporting shaft and being adapted for securely clamping opposed sides thereof in an adjusted position simultaneously with the clamping of said electrode holders.

2. In an adjustable clamp, a pair of separable clamping brackets, means for selectively drawing said brackets towards each other in a clamping action, means to clamp opposite sides of a member between said brackets upon said clamping action and including a pair of cooperating pivotal clamps, one of each being pivotally mounted co-axially with the other in one of each of said brackets for pivotal adjustment, said pivotal clamps being rigidly held in their adjusted positions by friction with said clamping brackets as the latter are drawn toward each other in said clamping action, and a supporting shaft for said clamping brackets, said clamping bracket being slidably and rotatably adjustable on said shaft and adapted for securely clamping the latter in an adjusted position simultaneously with the clamping of said member between said paired pivotal clamps.

3. In a universally adjustable clamp for a welding electrode holder, the combination of a pair of opposed clamping brackets, means to force said brackets toward each other in a clamping action, a pair of opposed pivotal clamps for an electrode holder, one of each being frictionally seated and pivotally mounted on one of each of said clamping brackets for pivotal adjusting movement co-axially with the other, said pivotal clamps being forced into clamping engagement with the opposed sides of an electrode holder therebetween, and being frictionally secured in an adjusted position upon forcing said brackets toward each other in said clamping action, and a supporting shaft for said clamping brackets, said clamping brackets being slidably and rotatably adjustable on said supporting shaft and adapted for securely clamping opposed sides thereof in an adjusted position simultaneously with the clamping of said electrode holder.

JAMES C. COX.

REFERENCES CITED

The following references are of record in the file of this patent:

UNITED STATES PATENTS

| Number | Name | Date |
| --- | --- | --- |
| 1,198,186 | Brown | Sept. 12, 1916 |
| 1,635,164 | Amdur | July 12, 1927 |
| 1,854,951 | Neuwirth | Apr. 19, 1932 |
| 2,059,605 | Powell | Nov. 3, 1936 |